No. 876,600. PATENTED JAN. 14, 1908.
C. W. SHEEHAN.
TROLLEY GUARD.
APPLICATION FILED OCT. 11, 1907.
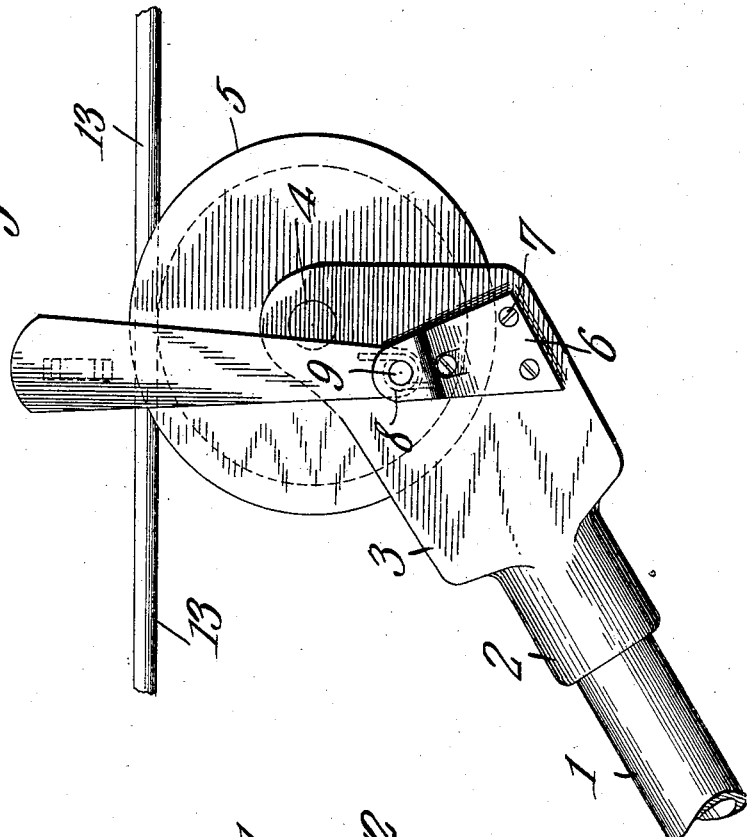
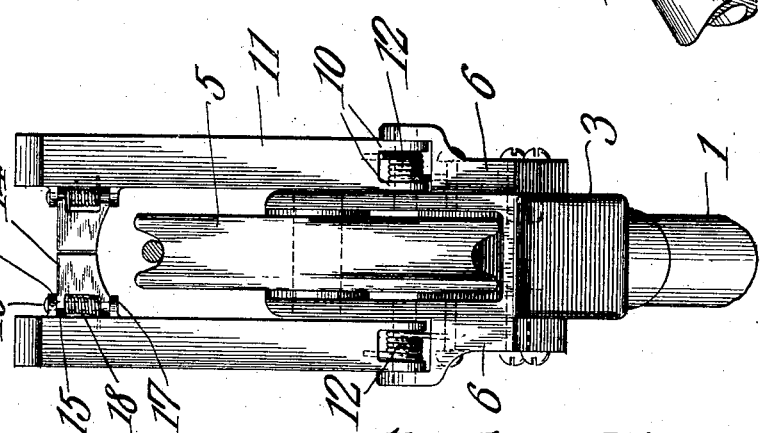
Charles W. Sheehan
Inventor

UNITED STATES PATENT OFFICE.

CHARLES WILLIAM SHEEHAN, OF LUBEC, MAINE.

TROLLEY-GUARD.

No. 876,600.  Specification of Letters Patent.  Patented Jan. 14, 1908.

Application filed October 11, 1907. Serial No. 396,996.

*To all whom it may concern:*

Be it known that I, CHARLES WILLIAM SHEEHAN, a subject of the King of England, residing at Lubec, in the county of Washington and State of Maine, have invented a new and useful Trolley-Guard, of which the following is a specification.

This invention has reference to improvements in trolley guards, and its object is to provide a means for maintaining the trolley wheel in engagement with the conductor under the various conditions of service while at the same time the trolley wheel may be purposely removed from the conductor or placed into electrical connection with the same when desired.

The invention comprises essentially an attachment for an ordinary trolley wheel bracket whereby there are provided guard arms on each side of the wheel extending above the trolley wire when the wheel is in engagement therewith, and these arms are so mounted as to yield elastically in planes parallel to the length of the trolley wire so that the guard will pass under stay wires, while above the trolley wire when the guards are in their normal position the said guards carry elastically yielding gates, which latter under the conditions of running will prevent the trolley wheel from escaping from the trolley wire.

The invention will be best understood from the following detailed description taken in connection with the accompanying drawings forming a part of this specification, in which Figure 1 is an end view of a trolley head equipped with the invention, and Fig. 2 is a side view of the same.

Referring to the drawings, there is shown a trolley pole 1 which may be of ordinary construction, and this pole terminates in a head 2 having two parallel wings 3 supporting the journal 4 of a trolley wheel 5, which latter may be of the ordinary construction. Fast on opposite sides of the wings 3 are brackets 6 secured by screws 7 or otherwise, and these brackets terminate each in an ear 8 parallel with or offset from the corresponding wings 3. Mounted in the ear 8 of each bracket and also in the corresponding wing 3, is a pin 9 receiving two spaced parallel ears 10 on the lower end of an arm 11 extending up alongside of the wings 3, and above the same and also above the trolley wheel 5. These arms each receive one end of a helical spring 12 surrounding the pin 8 between the two ears 10 while the other end of this spring is seated in the corresponding bracket 6. Each arm 11 is constrained by the spring 12 to remain in an upright position so as to straddle the wheel 5 and extend for a distance above the trolley wire 13, when the wheel 5 is underriding the same.

Near the upper end of each arm 11 there is a gate 14 provided at one end with two spaced ears 15 mounted on ordinary pins 16, and confined thereon by other spaced ears 17 formed on or secured to the inner face of the particular arm 11. Surrounding the pin 16 is a helical spring 18 secured to the gate 14 and arm 11 in like manner to the way of securing the spring 12 to the arm 11 and bracket 6. The two gates have their free ends close to each other though not necessarily touching, the space between these ends being too small to permit the trolley wire 13 to pass between them when the gates are under the normal stress of the springs 18.

Should there be any tendency of the wheel 5 to lift the trolley wire, for instance when the car is passing around a curve and the trolley pole is therefore under side stress, the trolley wire will be engaged by the gates 14 or the side arms 11, as the case may be, and so when the stress is relieved the wire will again seat itself in the wheel.

Should the device come in contact with a guy wire then the arms 11 will move about the pins 9 against the stress of the springs 12 and the gates 14 coming in contact with the trolley wire in position to be forced apart thereby will spread sufficiently, moving about the pin 16 against the springs 18 to permit the trolley wire to escape. When, however, the guy wire has been passed the springs 12 will return the arms 11 to their normal upright position and the gates will snap by the trolley wire 13 to be again brought over the same with their axes perpendicular to the length of the wire. In this position any upward movement of the wire toward the gates 14 will fail to turn them on their axes and consequently the wire cannot escape through the gates.

What is claimed is:—

1. A trolley guard comprising side arms, one on each side of the trolley wheel having pivotal supports at their lower ends out of line with the axis of the trolley wheel and springs normally tending to hold the arms in vertical position but yielding to strains in either direction tending to turn these arms about their pivots, and two gates one on each arm near the free end of the arm, the said gates being mounted on pivots arranged longitudinally with reference to the arms, and springs controlling the gates to hold them normally in line one with the other with their free ends too close to permit the passage of the trolley wire.

2. A trolley guard comprising two arms flanking the trolley wheel and spring controlled to normally assume an upright position when the trolley wheel is in engagement with the trolley wire, and each movable about an axis eccentric to the axis of the trolley wheel and spring-controlled gates one on each arm and bridging the space between the arms above the trolley wire when the wheel is in engagement therewith, the said gates yielding in a direction at right angles to the direction of yield to the arms.

3. A trolley guard comprising brackets attachable to a trolley head and each having an ear spaced away from the corresponding portion of the trolley head, an arm pivotally supported by each bracket and having spaced ears housed in said bracket, a spring engaging the arm and bracket and tending to normally maintain the arm in an upright position when the trolley wheel is in engagement with the trolley wire, and gates having spaced ears mounted on a pivot pin carried by a corresponding arm, and a spring surrounding the pivot pin of the gate and engaging both the gate and the arm for maintaining the gate in normal position at right angles to the arm and over the trolley wire when in engagement with the trolley wheel.

In testimony that I claim the foregoing as my own, I have hereto affixed my signature in the presence of two witnesses.

CHARLES WILLIAM SHEEHAN.

Witnesses:
J. H. GRAY,
G. M. GRAY.